(12) United States Patent
Hagshenas

(10) Patent No.: US 12,372,050 B2
(45) Date of Patent: *Jul. 29, 2025

(54) REMOVING NON-HOMOGENEOUS ICE FROM A FUEL SYSTEM

(71) Applicant: RTX Corporation, Farmington, CT (US)

(72) Inventor: Behzad Hagshenas, San Diego, CA (US)

(73) Assignee: RTX CORPORATION, Farmington, CT (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/460,617

(22) Filed: Aug. 30, 2021

(65) Prior Publication Data

US 2021/0388766 A1 Dec. 16, 2021

Related U.S. Application Data

(63) Continuation of application No. 14/768,988, filed as application No. PCT/US2014/017697 on Feb. 21, 2014, now Pat. No. 11,105,267.

(Continued)

(51) Int. Cl.
F02M 35/08 (2006.01)
B01D 21/00 (2006.01)
(Continued)

(52) U.S. Cl.
CPC ......... F02M 35/088 (2013.01); B01D 21/009 (2013.01); B01D 21/262 (2013.01); B04B 15/02 (2013.01); F02C 7/224 (2013.01); F02C 7/236 (2013.01); F05D 2260/606 (2013.01); F05D 2260/98 (2013.01); F05D 2270/303 (2013.01)

(58) Field of Classification Search
None
See application file for complete search history.

(56) References Cited

U.S. PATENT DOCUMENTS 4,428,351 A * 1/1984 Davis ............... F02M 37/28
123/557
4,696,156 A * 9/1987 Burr .................. B64D 37/34
60/39.08

(Continued)

FOREIGN PATENT DOCUMENTS

WO 2010103305 A2 9/2010
WO 2012140373 A1 10/2012

OTHER PUBLICATIONS

PCT Intellectual Property Office, International Application Division, International Search Report, dated Jun. 10, 2014 for PCT/US2014/017697.

(Continued)

Primary Examiner — Gerald L Sung
Assistant Examiner — Jacek Lisowski
(74) Attorney, Agent, or Firm — CANTOR COLBURN LLP

(57) ABSTRACT

The presently disclosed embodiments utilize an ice separator vessel to trap ice particles in a non-homogeneous ice/fuel mixture flowing in a fuel system. A source of heat, such as heated fuel provided to the ice separator vessel, is used to melt at least a portion of the ice particles so that they do not enter the fuel system downstream of the ice separator vessel.

9 Claims, 5 Drawing Sheets

Related U.S. Application Data

(60) Provisional application No. 61/767,388, filed on Feb. 21, 2013.

(51) Int. Cl.
| | | |
|---|---|---|
| *B01D 21/26* | (2006.01) | |
| *B04B 15/02* | (2006.01) | |
| *F02C 7/224* | (2006.01) | |
| *F02C 7/236* | (2006.01) | |

(56) References Cited

U.S. PATENT DOCUMENTS

| | | | |
|---|---|---|---|
| 4,714,405 A * | 12/1987 | Schaefer | F04D 29/0416 |
| | | | 415/176 |
| 5,110,269 A * | 5/1992 | Fallon | F02C 7/236 |
| | | | 417/283 |
| 5,495,715 A | 3/1996 | Loxley | |
| 5,643,470 A | 7/1997 | Amini | |
| 6,251,270 B1 | 6/2001 | Blot-Carretero et al. | |
| 6,440,317 B1 | 8/2002 | Koethe | |
| 7,524,426 B2 | 4/2009 | Milton | |
| 8,221,633 B2 * | 7/2012 | Lam | B01D 17/085 |
| | | | 244/135 R |
| 8,618,444 B2 | 12/2013 | Jones | |
| 2003/0136103 A1 | 7/2003 | Reuter et al. | |
| 2008/0250792 A1 * | 10/2008 | Wang | F02C 7/275 |
| | | | 60/778 |
| 2012/0067057 A1 | 3/2012 | Hofmann | |
| 2013/0036722 A1 * | 2/2013 | Hashenas | F02C 7/224 |
| | | | 60/39.83 |
| 2013/0068704 A1 * | 3/2013 | Hagshenas | B64D 37/34 |
| | | | 210/348 |
| 2013/0232989 A1 | 9/2013 | Osorio | |
| 2014/0023525 A1 | 1/2014 | Potel et al. | |
| 2016/0003160 A1 | 1/2016 | Hagshenas | |

OTHER PUBLICATIONS

European Search Report for EP 14 75 3836.
PCT Intellectual Property Office, International Application Division, Written Opinion of the International Search Authority, dated Jun. 10, 2014 for PCT/US2014/017697.

* cited by examiner

REMOVING NON-HOMOGENEOUS ICE FROM A FUEL SYSTEM

CROSS REFERENCE TO RELATED APPLICATION

This application is a continuation of U.S. patent application Ser. No. 14/768,988 filed on Aug. 19, 2015 which is a national stage of and claims the priority benefit of PCT Application Serial No. PCT/US2014/017697 filed on Feb. 21, 2014, which claims the priority benefit of U.S. Patent Application Ser. No. 61/767,388, filed on Feb. 21, 2013, the contents each of which are incorporated herein by reference thereto.

TECHNICAL FIELD OF THE DISCLOSURE

The present disclosure generally related to fuel systems and, more specifically, to systems and methods for removing ice from a fuel system.

BACKGROUND OF THE DISCLOSURE

Fuel systems that supply fuel to engines are sometimes required to operate in extreme environments. For example, fuel systems supplying fuel to a gas turbine engine on an aircraft are expected to operate at high altitudes where ambient temperatures are very low. Consequently, the freezing of water and therefore the formation of ice in the liquid fuel is a concern. The performance of the engine will be adversely affected if ice entrained in the fuel reaches the engine.

Therefore, systems and methods to remove ice that has formed in a fuel system are needed. The presently disclosed embodiments are directed to this need.

SUMMARY OF THE DISCLOSURE

The presently disclosed embodiments utilize an ice separator vessel to trap ice particles in a non-homogeneous ice/fuel mixture flowing in a fuel system. A source of heat, such as heated fuel provided to the ice separator vessel, is used to melt at least a portion of the ice particles so that they do not enter the fuel system downstream of the ice separator vessel.

In one embodiment, a fuel system is disclosed, comprising: an ice separator vessel configured to separate ice particles from a first supply of fuel comprising a non-homogeneous fuel/ice mixture, and to receive heat from a source of heat, wherein the heat melts at least a portion of the ice particles in the ice separator vessel.

In another embodiment, a fuel system is disclosed, comprising: an ice separator vessel configured to separate ice particles from a first supply of fuel comprising a non-homogeneous fuel/ice mixture, and to receive a second supply of fuel, wherein the second supply of fuel melts at least a portion of the ice particles in the ice separator vessel.

In another embodiment, a fuel system is disclosed, comprising: a first supply of first fuel comprising a non-homogeneous fuel/ice mixture at a first temperature; a vessel including a first vessel input operatively coupled to the first supply, a second vessel input, and a vessel output, the vessel being operative to substantially separate at least a portion of ice particles from the non-homogeneous fuel/ice mixture such that fuel may be discharged from the vessel output while said ice particles remain in the vessel; and a second supply of second fuel at a second temperature greater than the first temperature, the second supply operatively coupled to the second vessel input; wherein the second fuel applied to the second vessel input is operative to melt at least a portion of the ice particles within the vessel.

In another embodiment, a method for melting ice in anon-homogeneous fuel/ice mixture in a fuel system is disclosed, the method comprising the steps of: a) receiving a first fuel comprising anon-homogeneous fuel/ice mixture at an ice separator vessel, the first fuel having a first temperature; b) separating at least a portion of ice particles from the non-homogeneous fuel/ice mixture within the ice separator vessel; and c) melting at least a portion of the ice particles within the ice separator vessel.

Other embodiments are also disclosed.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

An overview of the features, functions and/or configuration of the components depicted in the figures will now be presented. It should be appreciated that not all of the features of the components of the figure are necessarily described. Some of these non-discussed features, as well as discussed features are inherent from the figure. Other non-discussed features may be inherent in component geometry and/or configuration.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1A:
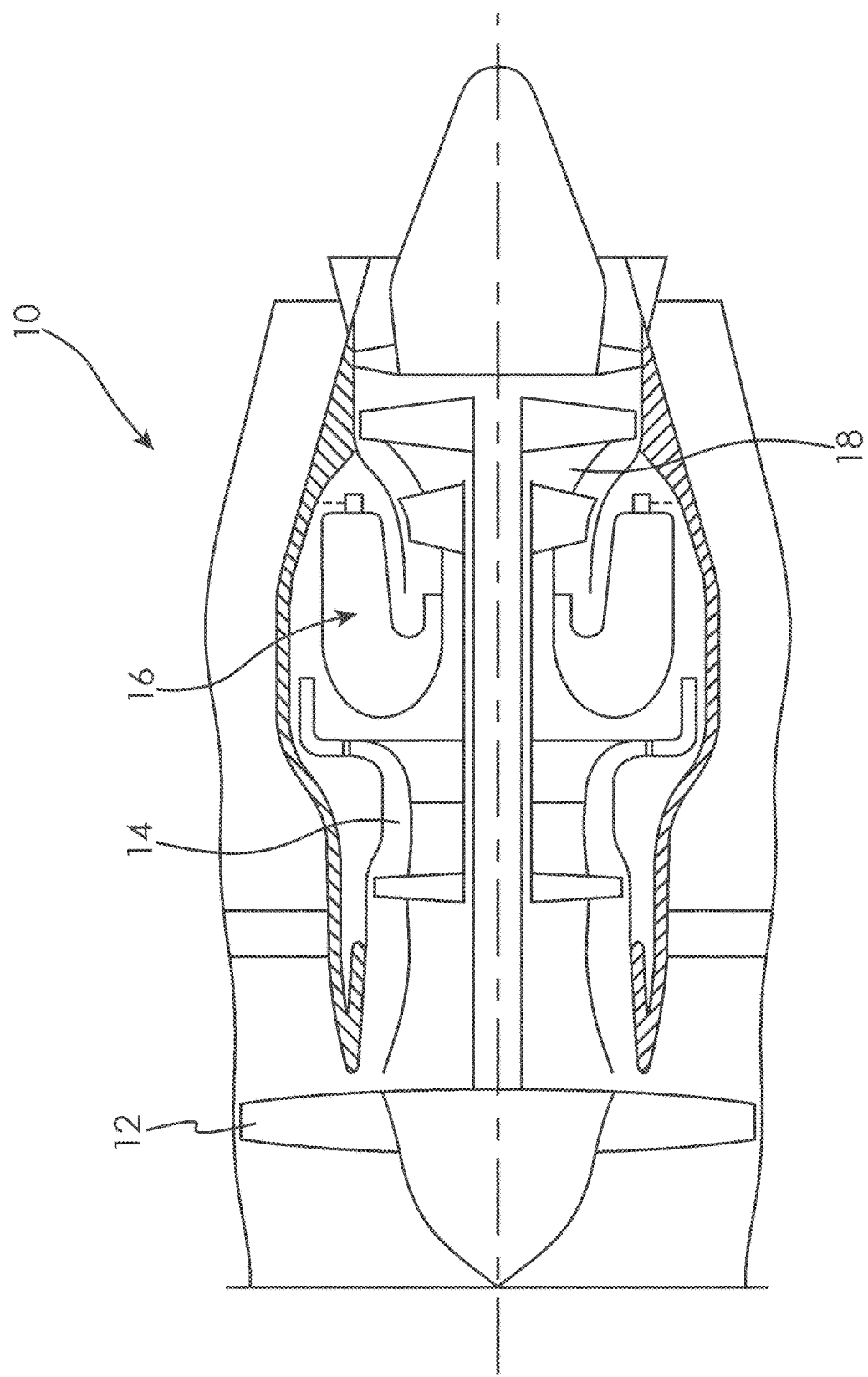
FIG. 1A is a schematic cross-sectional diagram of an embodiment of a gas turbine engine.

Although the embodiments disclosed herein may be used with any fuel system supplying any type of engine, a gas turbine engine and an auxiliary power unit are used as exemplary, non-limiting embodiments herein. FIG. 1A illustrates a gas turbine engine 10 of a type normally provided for use in a subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 1B:
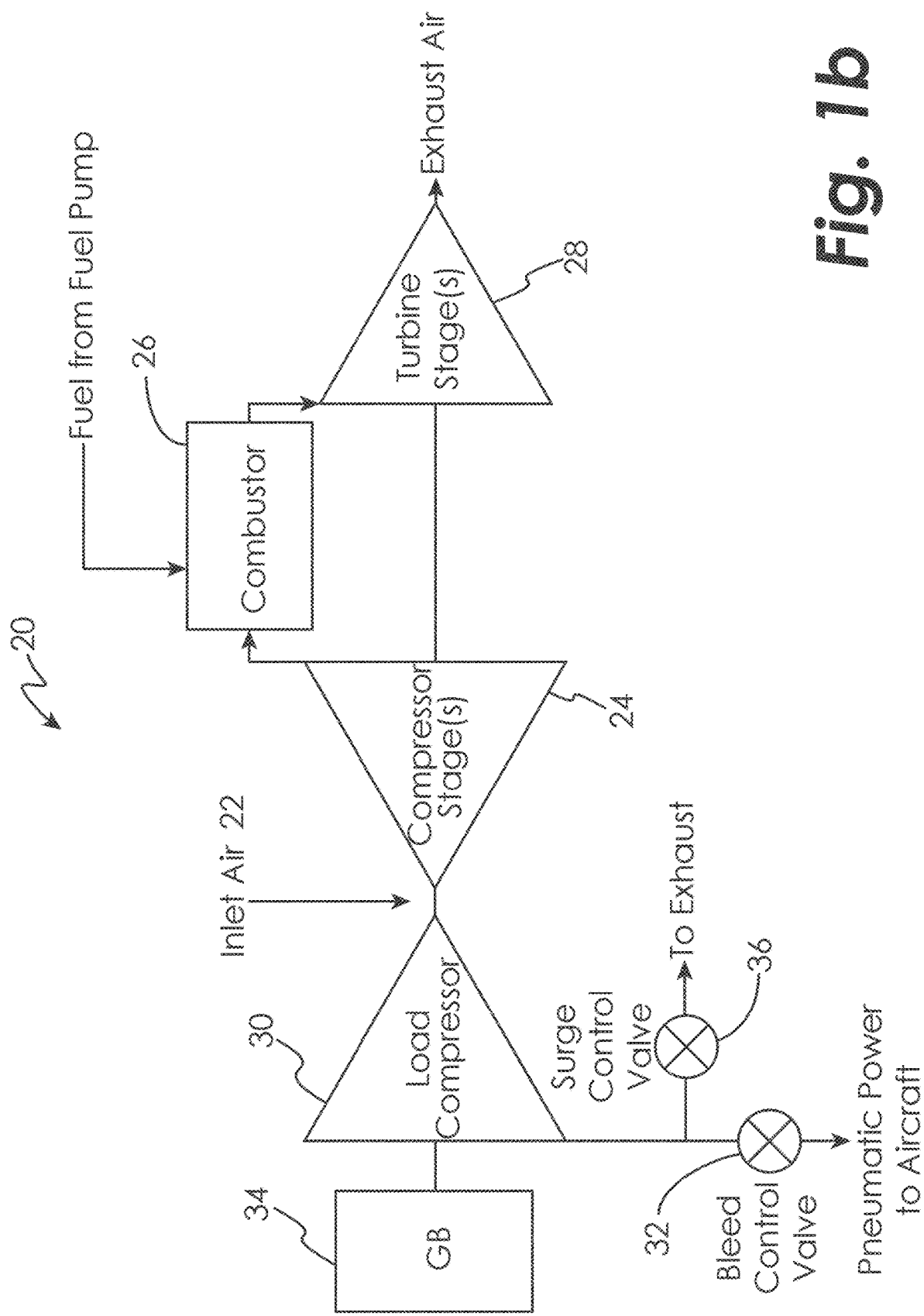
FIG. 1B is a schematic diagram of an embodiment of an auxiliary power unit.

FIG. 1B illustrates a gas turbine auxiliary power unit (APU), indicated generally at 20. APU 20 includes a source of inlet air 22, a compressor section 24 for pressurizing the air, a combustor 26 in which the compressed air is mixed with fuel and ignited for generating an annular stream of hot combustion gases, and a turbine section 28 for extracting energy from the combustion gases. A shaft-mounted load compressor 30 provides pneumatic power (through bleed control valve 32) for the aircraft in which the APU is mounted, while a gearbox 34 transfers power from the shaft of the APU to other accessories (not shown). Surge control valve 36 maintains stable, surge-free operation of the APU 20.

Fuel systems supplying fuel to gas turbine engines on an aircraft are expected to operate with very cold fuel temperatures. Most fuel has some water content, and at these cold fuel temperatures, water absorbed in the fuel will come out of saturation in the form of ice crystals. Some of these ice crystals are well mixed with the fuel as a homogeneous mixture. However, some of these ice crystals may stick to cold surfaces within the fuel tank and the fuel lines leading to the engines, and then suddenly release themselves in form of ice particles that are not well-mixed with the fuel and travel in the fuel toward the engine as a non-homogeneous mixture.

Many engines incorporate a fuel oil heat exchanger to increase the temperature of the fuel, causing melting of ice crystals in the homogenous state to prevent ice accumulation in the fuel filter and/or other fuel system components. However, these systems are ineffective with relatively large quantities of ice particles that may travel in the fuel lines as a non-homogeneous mixture. These ice particles could partially or fully prevent fuel flow into the engine fuel system components such as the fuel pump, fuel oil heat exchanger, etc. This can adversely affect the performance of the engine. The presently disclosed embodiments effectively deal with ice particles in a non-homogeneous mixture in a fuel system.

Figure 2:
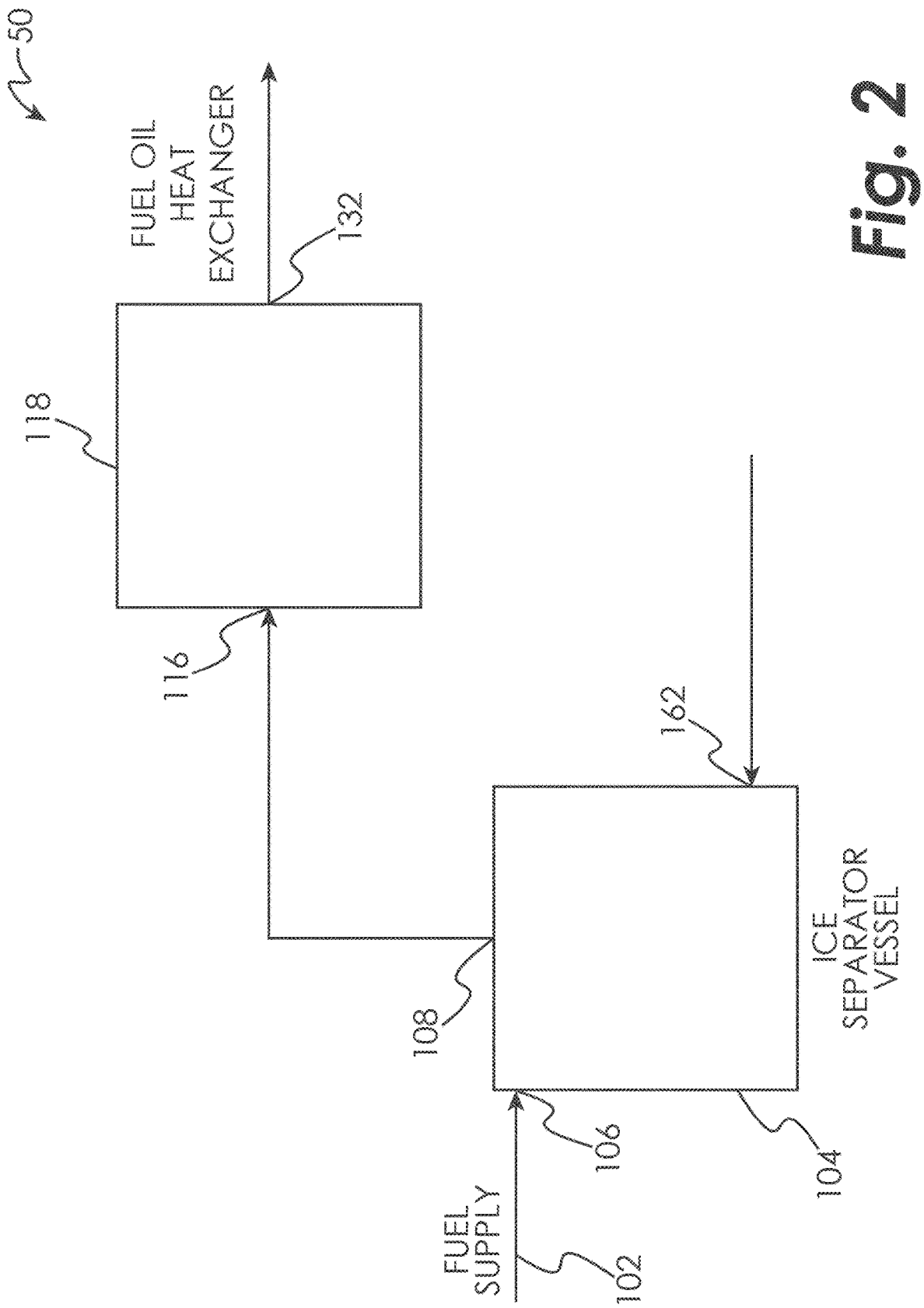
FIG. 2 is a schematic diagram of a portion of a fuel system according to an embodiment.

Referring now to FIG. 2, selected components of one embodiment of a fuel system are schematically illustrated and indicated generally at 50. It will be appreciated by those skilled in the art that the fuel system may be configured in a great variety of ways, and that the fuel system 50 illustrated in FIG. 2 is but one example. Fuel from a storage container, such as an aircraft fuel tank (not shown) is supplied via fuel supply line 102. This fuel is introduced into an ice separator vessel 104 at a first ice separator vessel input 106. The ice separator vessel 104 operates to substantially separate the ice particles in a non-homogeneous fuel mixture by any desired means, such as by centrifugation or settling (since the ice particles are heavier than the fuel), to name just two non-limiting examples. The means used to separate the ice particles from the fuel are not critical to the presently disclosed embodiments.

The separated fuel (substantially free from the ice particles in anon-homogeneous mixture) is withdrawn from ice separator vessel output 108 and applied to a fuel input 116 of fuel oil heat exchanger 118. The fuel oil heat exchanger 118 operates to heat the fuel by placing it in close proximity to warm oil from the engine gearbox sump, or other convenient oil source (not shown), which has been heated by passing through the engine.

Fuel applied to the fuel input 116 of fuel oil heat exchanger 118 passes through heat exchanger coils (not shown) without coming into direct contact with the oil. However, some of the heat of the oil is transferred to the fuel within the fuel oil heat exchanger 118, increasing the temperature of the fuel. Fuel thus heated exits the fuel oil heat exchanger 118 at fuel output 132.

The fuel exiting the fuel output 132 of the fuel oil heat exchanger 118 is at an elevated temperature. The excess/unburned portion of this heated fuel may be applied to a second input 162 of the ice separator vessel 104 in order to elevate the temperature of the fuel within the ice separator vessel 104 and thereby contribute to the melting of the ice particles trapped within the ice separator vessel 104 that were separated from the fuel applied to the first ice separator vessel input 106 of the ice separator vessel 104. This continual application of heated fuel to the ice separator vessel 104 provides thermal energy that may be used to melt the ice particles separated by the ice separator vessel 104, thereby reducing or eliminating the amount of non-homogeneous fuel/ice mixture that enters the fuel system downstream of the ice separator vessel 104. In other embodiments, other heat sources may be used, such as using bleed air from the engine as a heat source or using an electric heat source, to name just two non-limiting examples. The heat from these sources may be used to heat the fuel that is applied to the ice separator vessel 104, or the heat from these sources may be applied directly to the ice separator vessel 104. The source of heat is not critical to the presently disclosed embodiments.

Figure 3:
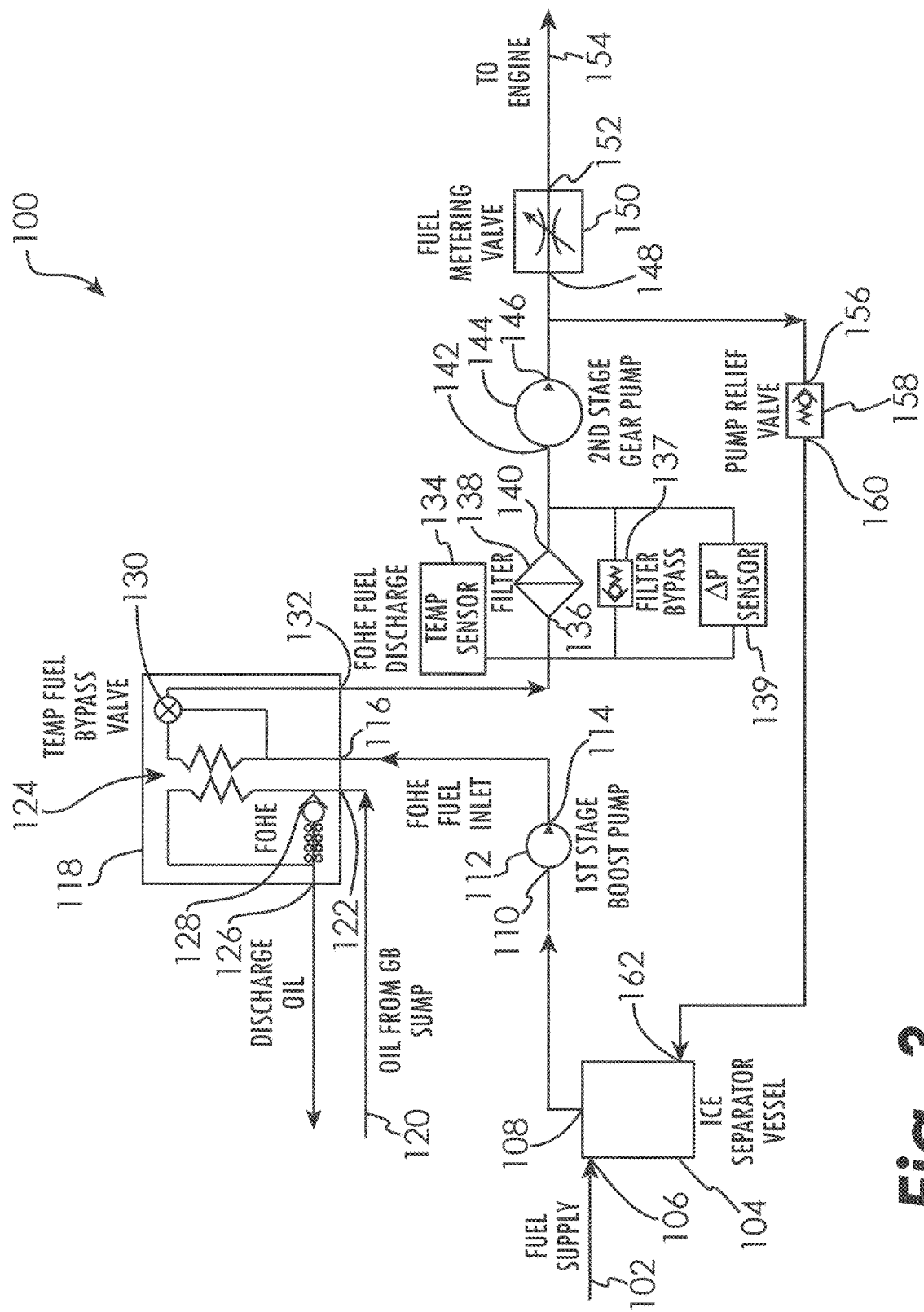
FIG. 3 is a schematic diagram of a portion of a fuel system according to an embodiment.

Referring now to FIG. 3, selected components of one embodiment of a fuel system are schematically illustrated and indicated generally at 100. It will be appreciated by those skilled in the art that the fuel system may be configured in a great variety of ways, and that the fuel system 100 illustrated in FIG. 3 is but one example. Fuel from a storage container, such as an aircraft fuel tank (not shown) is supplied via fuel supply line 102. This fuel is introduced into an ice separator vessel 104 at a first ice separator vessel input 106. The ice separator vessel 104 operates to substantially separate the ice particles in the non-homogeneous fuel mixture by any desired means, such as by centrifugation or settling (since the ice particles are heavier than the fuel), to name just two non-limiting examples. The means used to separate the ice particles from the fuel are not critical to the presently disclosed embodiments.

The separated fuel (substantially free from the ice particles in anon-homogeneous mixture) is withdrawn from ice separator vessel output 108 by coupling the input 110 of a first stage boost pump 112. The output 114 of the first stage pump 112 is applied to a fuel input 116 of fuel oil heat exchanger 118. The fuel oil heat exchanger 118 operates to heat the fuel by placing it in close proximity to warm oil from the engine gearbox sump, or other convenient oil source (not shown), which has been heated by passing through the engine. To this end, an oil supply line 120 from the gearbox sump supplies oil to oil input 122 so that it may be passed through the heat exchanger coils 124 that forms part of the fuel oil heat exchanger 118. Once the oil passes through the heat exchanger coils 124, it is discharged from the fuel oil heat exchanger oil output 126 and returned back to the gearbox sump (or other desired location). A check valve 128 may be provided to limit the pressure of the oil in the heat exchanger 124.

Fuel applied to the fuel input 116 of fuel oil heat exchanger 118 also passes through the heat exchanger coils 124 without coming into direct contact with the oil. However, some of the heat of the oil is transferred to the fuel within the fuel oil heat exchanger 118, increasing the temperature of the fuel. A bypass valve 130 may be provided in order to allow some fuel to bypass the heat exchanger coils 124 if the temperature of the fuel exiting the heat exchanger coils 124 is above a predetermined temperature. Fuel thus heated exits the fuel oil heat exchanger 118 at fuel output 132.

A temperature sensor 134 may be provided to monitor the temperature of the fuel exiting the fuel oil heat exchanger 118 to provide a system check that the fuel oil heat exchanger 118 is operating correctly. For example, if the fuel discharged from fuel output 132 is below a preset temperature, an indication may be produced to check for proper functioning of the bypass valve 130 or other portions of the fuel oil heat exchanger 118.

The heated fuel discharged from fuel output 132 may be filtered by applying the fuel to the input 136 of a filter 138. A check valve 137 maybe coupled between the filter input 136 and a filter output 140 to allow fuel to bypass the filter 138 if the pressure difference becomes too great (for example, if the filter 138 is becoming clogged). A pressure sensor 139 may be coupled in parallel to the check valve 137 in order to provide a fuel system prognostic/diagnostic indication of filter clogging. The filter output 140 supplies the fuel to an input 142 of a second stage pump 144 (such as, for example, a gear pump). The output 146 of the second stage pump 144 may be applied to the input 148 of fuel metering valve 150. Fuel metering valve 150 determines how much of the fuel discharged from the output 146 of second stage pump 144 will be applied to the engine according to the current fuel needs of the engine, as is known in the art. Output 152 of the fuel metering valve 150 therefore discharges fuel at the desired rate into a fuel line 154 to the engine (not shown).

The first stage pump 112 and second stage pump 144 normally produce more fuel at output 146 than is needed by the engine because the pumps are sized to be able to supply enough fuel during engine start when the pump is operating at a much lower speed. For example, the first stage pump 112 and second stage pump 144 in an aircraft gas turbine engine application may be capable of producing three or more units of fuel per hour when the engine is operating at full speed, even though the engine may only require one unit of fuel per hour. This excess unburned fuel is normally returned to the input 110 of a first stage boost pump 112 or the input 142 of a second stage pump 144.

The fuel at all locations downstream of the fuel oil heat exchanger 118 is at an elevated temperature. The excess/unburned portion of this heated fuel may be applied to a second input 162 of the ice separator vessel 104 in order to elevate the temperature of the fuel within the ice separator vessel 104 and thereby contribute to the melting of the ice particles trapped within the ice separator vessel 104 that were separated from the fuel applied to the first ice separator vessel input 106 of the ice separator vessel 104. In other embodiments, other heat sources may be used, such as using bleed air from the engine as a heat source or using an electric heat source, to name just two non-limiting examples. The heat from these sources may be used to heat the fuel that is applied to the ice separator vessel 104, or the heat from these sources may be applied directly to the ice separator vessel 104. The source of heat is not critical to the presently disclosed embodiments.

In the illustrated embodiment, an input 156 of a pump relief check valve 158 is coupled to the output 146 of the second stage pump 144. When the fuel metering valve 150 is commanding fuel at a rate that is less than the rate produced by the first stage pump 112 and the second stage pump 144, a backpressure will develop, causing the pump relief check valve 158 to open. An output 160 of the pump relief check valve 158 is applied to a second input 162 of the ice separator vessel 104. In other embodiments, the output 160 of pump relief check valve 158 may simply be coupled to the first ice separator vessel input 106 of ice separator vessel 104. This continual application of heated fuel to the ice separator vessel provides thermal energy that may be used to melt the ice particles separated by the ice separator vessel 104, thereby reducing or eliminating the amount of non-homogeneous fuel/ice mixture that enters the fuel system downstream of the ice separator vessel 104.

It will be appreciated from the present disclosure that the heated fuel applied to the ice separator vessel 104 may be sourced from any location (or from multiple locations) within the fuel system where the fuel has a sufficiently elevated temperature, the use of excess heated fuel upstream of the fuel metering valve 150 being illustrated merely as one non-limiting example.

It will also be appreciated from the present disclosure that the ice separator vessel 104 may be placed at different locations within the fuel system, and its location prior to the first stage pump 112 is illustrated merely as one non-limiting example. In some embodiments, the ice separator vessel 104 may be placed downstream of the first stage pump 112, with the pump 112 pressure pushing fuel through the ice separator vessel 104 or a secondary pump (not shown) provided to pull fuel from the output 108 of the ice separator vessel 104. In still other embodiments, the ice separator vessel 104 may form a part of the fuel oil heat exchanger 118.

Figure 4:
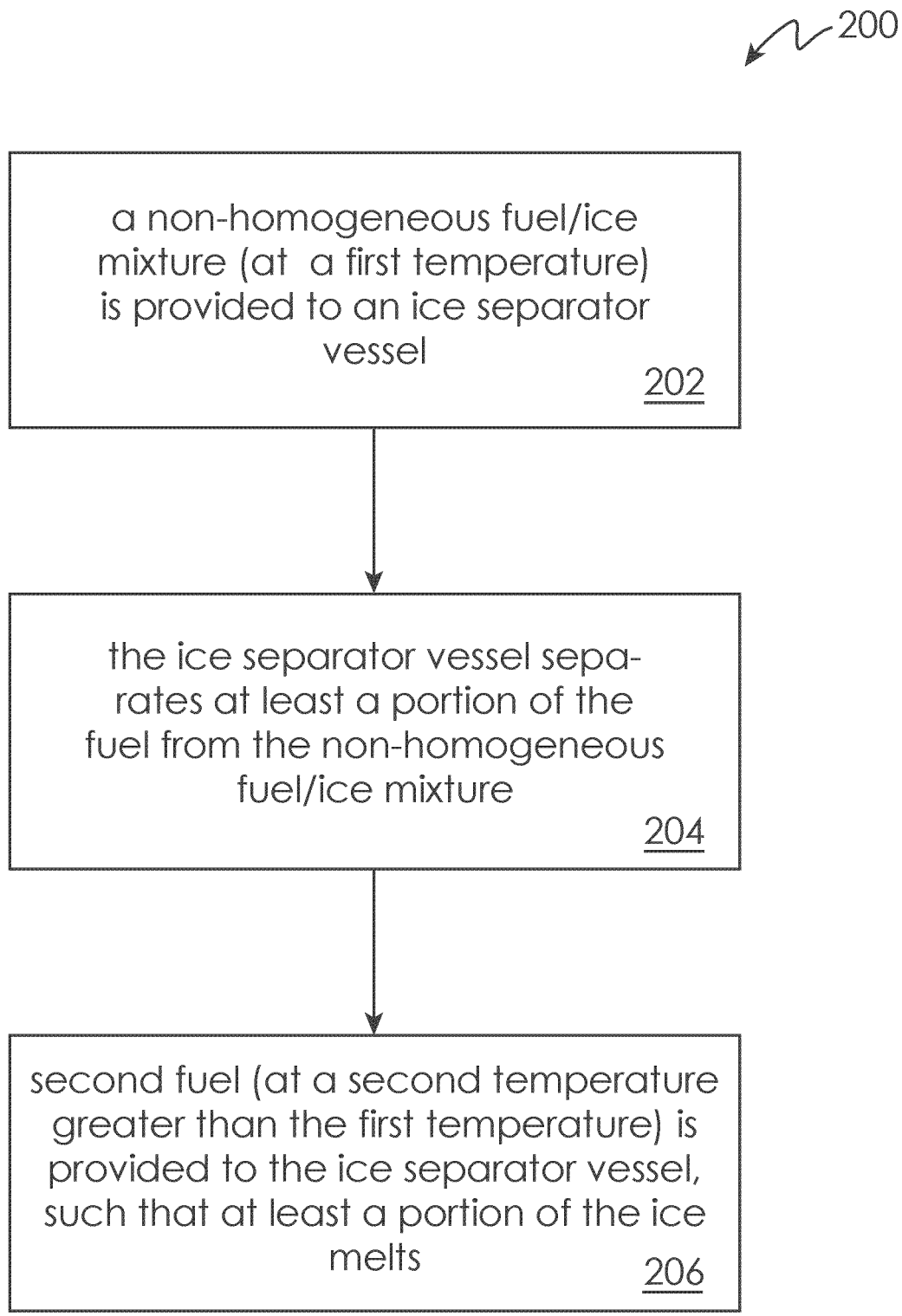
FIG. 4 is a process flow diagram of a method according to an embodiment.

Thus, it will be appreciated that the various embodiments operate to provide a method 200 as illustrated in FIG. 4 for melting anon-homogeneous fuel/ice mixture in a fuel system, wherein anon-homogeneous fuel/ice mixture is provided to the ice separator vessel 104 at block 202, and the non-homogeneous fuel/ice mixture has a first temperature. At block 204, the ice separator vessel 104 separates at least a portion of the fuel from the non-homogeneous fuel/ice mixture within the ice separator vessel 104. At block 206, second fuel is provided to the ice separator vessel 104, the second fuel having a second temperature that is greater than the first temperature, such that the second fuel is operative to melt at least a portion of the ice particles within the ice separator vessel 104. It will be appreciated from the above disclosure that the second fuel may be added to the ice separator vessel 104 prior to introduction of the non-homogeneous fuel/ice mixture, and in many instances non-homogeneous fuel/ice mixture and second fuel will be continuously and concurrently added to the ice separator vessel 104. In other embodiments, heat from a source other than the second fuel may be applied to the ice separator vessel 104.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:
1. A fuel system comprising:
an ice separator vessel configured to separate ice particles from a first supply of fuel comprising a non-homogeneous fuel/ice mixture, the first supply of fuel being supplied to the ice separator vessel by a fuel supply line at a first ice separator vessel input;
a first stage pump coupled to an output of the ice separator vessel;
a heat exchanger coupled to an output of the first stage pump;

a second stage pump coupled to a fuel output of the heat exchanger;

a pump relief check valve coupled to an output of the second stage pump, wherein the pump relief check valve provides heated fuel to a second input of the ice separator vessel and wherein the heated fuel is at a temperature greater than a temperature of the first supply of fuel and the heated fuel melts at least a portion of the ice particles in the ice separator vessel, wherein the heat exchanger is a fuel oil heat exchanger in a gas turbine engine.

2. The fuel system of claim 1, wherein the ice separator vessel is configured to separate the ice particles from the non-homogeneous fuel/ice mixture by centrifugation.

3. The fuel system of claim 1, wherein the ice separator vessel is configured to separate the ice particles from the non-homogeneous fuel/ice mixture by settling.

4. A fuel system comprising:
an ice separator vessel configured to separate ice particles from a first supply of fuel comprising a non-homogeneous fuel/ice mixture, and to receive a second supply of fuel;
wherein the second supply of fuel melts at least a portion of the ice particles in the ice separator vessel.

5. The fuel system of claim 4, wherein: the first supply of fuel is at a first temperature; and the second supply of fuel is at a second temperature greater than the first temperature.

6. The fuel system of claim 4, wherein the ice separator vessel is configured to separate the ice particles from the non-homogeneous fuel/ice mixture by centrifugation.

7. The fuel system of claim 4, wherein the ice separator vessel is configured to separate the ice particles from the non-homogeneous fuel/ice mixture by settling.

8. The fuel system of claim 4, wherein the second supply of fuel is received from a fuel oil heat exchanger in a gas turbine engine.

9. A fuel system, comprising:
a first supply of first fuel comprising a non-homogeneous fuel/ice mixture at a first temperature;
a vessel including a first vessel input operatively coupled to the first supply of the first fuel, a second vessel input, and a vessel output, the vessel being operative to substantially separate at least a portion of ice particles from the non-homogeneous fuel/ice mixture such that fuel may be discharged from the vessel output while the at least the portion of ice particles remain in the vessel; and
a second supply of second fuel at a second temperature greater than the first temperature, the second supply of the second fuel operatively coupled to the second vessel input; wherein the second fuel applied to the second vessel input is operative to melt the at least the portion of the ice particles within the vessel.

* * * * *